United States Patent
Kalach et al.

(10) Patent No.: US 11,562,001 B2
(45) Date of Patent: Jan. 24, 2023

(54) RELIABLE HIERARCHICAL STORAGE MANAGEMENT WITH DATA SYNCHRONIZATION

(71) Applicant: Microsoft Technology Licensing, LLC, Redmond, WA (US)

(72) Inventors: Ran Kalach, Bellevue, WA (US); Spencer Alan Bishop, Kirkland, WA (US); Fenghua Yuan, Bellevue, WA (US); Kashif Hasan, Snoqualmie, WA (US); Jason Daniel Shay, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/445,250

(22) Filed: Aug. 17, 2021

(65) Prior Publication Data
US 2022/0129484 A1    Apr. 28, 2022

Related U.S. Application Data

(63) Continuation of application No. 15/637,769, filed on Jun. 29, 2017, now Pat. No. 11,113,312.

(51) Int. Cl.
| | |
|---|---|
| *G06F 16/30* | (2019.01) |
| *G06F 16/27* | (2019.01) |
| *G06F 11/14* | (2006.01) |
| *H04L 67/1095* | (2022.01) |
| *H04L 67/1097* | (2022.01) |

(Continued)

(52) U.S. Cl.
CPC ........ *G06F 16/275* (2019.01); *G06F 11/1451* (2013.01); *G06F 16/128* (2019.01); *G06F 16/178* (2019.01); *G06F 16/182* (2019.01); *G06F 16/185* (2019.01); *H04L 67/1095* (2013.01); *H04L 67/1097* (2013.01)

(58) Field of Classification Search
CPC ............. G06F 11/1451; G06F 11/2094; G06F 11/2097; G06F 16/178; G06F 16/182; G06F 16/185; G06F 16/275; H04L 29/0854; H04L 67/10; H04L 67/1095; H04L 67/1097; H04L 67/2823
See application file for complete search history.

(56) References Cited

U.S. PATENT DOCUMENTS

| | | | |
|---|---|---|---|
| 10,901,943 B1 * | 1/2021 | Bent | ............. G06F 3/0685 |
| 2012/0254321 A1 * | 10/2012 | Lindsay | ........ G06Q 10/107 |
| | | | 709/206 |

(Continued)

*Primary Examiner* — Mahesh H Dwivedi

(57) ABSTRACT

A system hosts a file system representing a replica of file systems hosted on a plurality of nodes, each node storing data on a first storage medium. The system stores data on a second storage medium that is slower than the first storage medium. The system stores on the second storage medium a file received from one of the nodes when the file remains un-accessed by the nodes for a predetermined period of time. The first storage medium on the plurality of nodes stores a pointer to the file and not the data content of the file stored on the second storage medium. The system provides the file from the second storage medium to the first storage medium on one of the nodes while providing the plurality of nodes read and write access to the file stored on the second storage medium using the pointer on the first storage medium.

20 Claims, 7 Drawing Sheets

(51) Int. Cl.
    *G06F 16/178*     (2019.01)
    *G06F 16/182*     (2019.01)
    *G06F 16/11*     (2019.01)
    *G06F 16/185*     (2019.01)

(56) References Cited

U.S. PATENT DOCUMENTS

2013/0185503 A1*   7/2013  Bhatta ................. G06F 16/1815
    711/E12.001
2018/0203636 A1*   7/2018  Pulipaka ............. H04L 67/1097

* cited by examiner

RELIABLE HIERARCHICAL STORAGE MANAGEMENT WITH DATA SYNCHRONIZATION

CROSS REFERENCE TO RELATED APPLICATIONS

This application is a continuation of U.S. patent application Ser. No. 15/637,769, filed on Jun. 29, 2017, the entirety of which is hereby incorporated herein by reference for all purposes.

FIELD

The present disclosure relates generally to data storage in distributed computing systems and more particularly to reliable hierarchical storage management with data synchronization in distributed computing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data synchronization and hierarchical storage management (HSM) solutions are disjoint products solving orthogonal problems. Data synchronization provides convenient access to data across boundaries such as geographies or devices with an additional cost for each synchronizing node since each synchronizing node has to store the data. HSM solutions provide cost-savings for storing data by putting less frequently used data on less expensive but slower storage media called cold storage.

SUMMARY

A system comprises a processor and machine readable instructions stored on a tangible machine readable medium. The machine readable instructions, when executed by the processor, configure the processor to host a file system. The file system represents a replica of file systems hosted on a plurality of nodes. Each of the plurality of nodes stores data on a first storage medium. The machine readable instructions further configure the processor to store data associated with the file system on a second storage medium. The second storage medium is slower to process data stored thereon than the first storage medium used by the plurality of nodes to store data. The machine readable instructions further configure the processor to store on the second storage medium a file received from one of the plurality of nodes when the file remains un-accessed by the plurality of nodes for a predetermined period of time. The first storage medium on the plurality of nodes stores a pointer to the file and not the data content of the file stored on the second storage medium. The machine readable instructions further configure the processor to provide the file from the second storage medium to the first storage medium on one of the plurality of nodes while providing the plurality of nodes read and write access to the file stored on the second storage medium using the pointer on the first storage medium.

In other features, the machine readable instructions further configure the processor to create a snapshot of content of a particular version of the file on the second storage medium. The particular version is immutable. The snapshot is a recallable instance of data backing the file on the second storage medium while the file is being used on one of the plurality of nodes.

In other features, the machine readable instructions further configure the processor to create a recallable instance of data backing the file on the second storage medium when the file is received from one of the plurality of nodes and stored on the second storage medium, when the file is opened on the one of the plurality of nodes, or before the file on the first storage medium is converted to the pointer.

In other features, the machine readable instructions further configure the processor to identify and locate the recallable instance of data backing the file using a namespace location of the recallable instance and information to determine that the recallable instance contains correct data for the file, or a unique and namespace-location-independent identifier for the recallable instance and a desired version of the recallable instance in the plurality of nodes.

In other features, the machine readable instructions further configure the processor to maintain synchronization between the file stored on the second storage medium and the file systems on the plurality of nodes.

In other features, the machine readable instructions further configure the processor to synchronize the file to the file systems on the plurality of nodes prior to completion of opening the file on one of the plurality of nodes.

In other features, the machine readable instructions further configure the processor to detect a change to the file on the second storage medium prior to synchronizing the file to the one of the plurality of nodes.

In other features, the machine readable instructions further configure the processor to synchronize, when the change is detected, a latest version of metadata of the file to the one of the plurality of nodes before the completion of opening the file on the one of the plurality of nodes.

In other features, the machine readable instructions further configure the processor to block modification of the file stored on the second storage medium while the file is being used on the one of the plurality of nodes.

In other features, the machine readable instructions further configure the processor to create a recallable instance of data backing the file on the second storage medium when the file is opened on the one of the plurality of nodes.

In still other features, a method comprises hosting a file system representing a replica of file systems hosted on a plurality of nodes, each of the plurality of nodes storing data on a first storage medium. The method further comprises storing data associated with the file system on a second storage medium, the second storage medium being slower to process data stored thereon than the first storage medium. The method further comprises receiving a file from one of the plurality of nodes when the file remains un-accessed by the plurality of nodes for a predetermined period of time. The method further comprises storing the file on the second storage medium, the plurality of nodes storing a pointer to the file and not the data content of the file on the first storage medium. The method further comprises providing the plurality of nodes read and write access to the file stored on the second storage medium using the pointer on the first storage medium.

In other features, the method further comprises creating a snapshot of content of a particular version of the file on the second storage medium, the particular version being immutable, and the snapshot being a recallable instance of data backing the file on the second storage medium while the file is being used on one of the plurality of nodes.

In other features, the method further comprises creating a recallable instance of data backing the file on the second storage medium when the file is received from one of the plurality of nodes and stored on the second storage medium, when the file is opened on the one of the plurality of nodes, or before the file on the first storage medium is converted to the pointer.

In other features, the method further comprises identifying and locating the recallable instance of data backing the file using a namespace location of the recallable instance and information to determine that the recallable instance contains correct data for the file, or a unique and namespace-location-independent identifier for the recallable instance and a desired version of the recallable instance in the plurality of nodes.

In other features, the method further comprises synchronizing the file to the file systems on the plurality of nodes prior to completion of opening the file on one of the plurality of nodes.

In other features, the method further comprises detecting a change to the file on the second storage medium prior to synchronizing the file to the one of the plurality of nodes. The method further comprises synchronizing, when the change is detected, a latest version of metadata of the file to the one of the plurality of nodes before the completion of opening the file on the one of the plurality of nodes.

In other features, the method further comprises blocking modification of the file stored on the second storage medium while the file is being used on the one of the plurality of nodes.

In still other features, a hierarchical storage management system comprises a processor and machine readable instructions stored on a tangible machine readable medium. The machine readable instructions, when executed by the processor, configure the processor to host a file system representing a replica of file systems hosted on a plurality of nodes, each of the plurality of nodes storing data on a first storage medium. The machine readable instructions further configure the processor to store data associated with the file system on a second storage medium that is slower to process data stored thereon than the first storage medium. The machine readable instructions further configure the processor to receive a file from one of the plurality of nodes when the file remains un-accessed by the plurality of nodes for a predetermined period of time. The machine readable instructions further configure the processor to store the file on the second storage medium, a pointer to the file and not the data content of the file being stored on the first storage medium on the plurality of nodes. The machine readable instructions further configure the processor to provide the plurality of nodes read and write access to the file stored on the second storage medium using the pointer on the first storage medium.

In other features, the machine readable instructions further configure the processor to create a snapshot of content of a particular version of the file on the second storage medium. The particular version is immutable. The snapshot is a recallable instance of data backing the file on the second storage medium while the file is being used on one of the plurality of nodes. The machine readable instructions further configure the processor to identify and locate the recallable instance of data backing the file.

In other features, the machine readable instructions further configure the processor to synchronize the file to the file systems on the plurality of nodes prior to completion of opening the file on one of the plurality of nodes.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
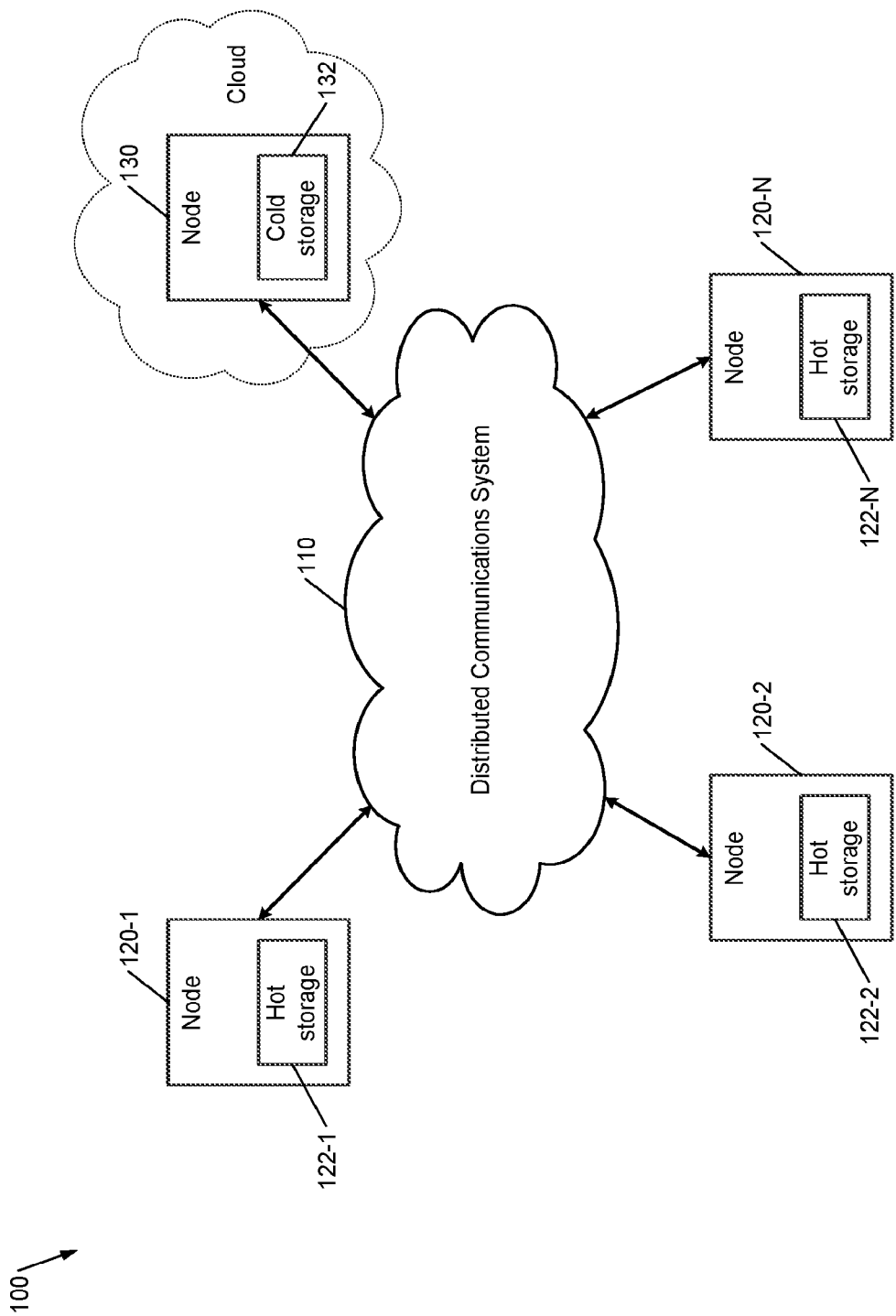
FIG. 1 shows a simplified example of a distributed computing system for storing data by combining the hierarchical storage management (HSM) and data synchronization solutions according to the present disclosure.

The present disclosure combines hierarchical storage management (HSM) and data synchronization solutions by turning one or more synchronizing nodes into cold storage for other nodes. The present disclosure is organized as follows. First, the terminology used in the present disclosure is described. Then an overview of the disclosure is presented with reference to FIGS. 1-3. Thereafter, while the present disclosure is not limited to cloud environment, since use of cloud storage as low-cost storage is proliferating, an overview of an example of a cloud computing system is presented with reference to FIGS. 4-6. Subsequently, a detailed description of the present disclosure follows. Finally, examples of methods according to the present disclosure are presented with reference to FIGS. 7-10.

The following terminology is used throughout the present disclosure.

Data Set—A data set is a collection of files and directories (e.g., a directory hierarchy) stored in a file system.

Node—A node is a computer system which hosts a data set for read or write access. In general, read/write access can be assumed, although some topologies may want to limit certain nodes to read-only access.

Data synchronization community—A data synchronization community (or sync community) is collection of nodes each of which hosts the same data set, with a data synchronization technology replicating changes to the data set across the nodes in the data synchronization community.

Hot Storage—Hot storage is expensive storage hosting a data set that generally needs to be limited in size to keep storage costs down. The fact that the storage is expensive may not be due to the cost of hardware itself, but may be due costs of ordering, deploying, managing, and backing up the hot storage. With the advent of public or private clouds, for example, the direct personnel costs associated with access to logically unlimited storage are low enough so that cloud storage may be cheaper than storage owned and managed by a business entity directly although the costs of the underlying hardware are similar or even more expensive on the public/private cloud side.

Cold Storage—Cold storage is inexpensive storage hosting a data set that should be used as much as possible in preference to host storage in order to keep storage costs down.

Tiered File—A tiered file is a file whose data is stored across hot and cold storage. Generally speaking, the content of a less frequently used file will be moved to cold storage to achieve cost savings, while some sort of pointer to the location of the data in cold storage will be all that remains in (the presumably more expensive) hot storage. Although the term tiered file is used in the present disclosure, such files may be called stubs, ghosts, or placeholders in other contexts.

Hot Node—A hot node is a node in the data synchronization community that may convert regular files to tiered files to achieve cost savings by relying on a copy of the tiered file's content on a cold node.

Cold Node—A cold node is a node in the data synchronization community that does not convert regular files to tiered files, and provides content for tiered files to hot nodes through data recall (see below).

Data Recall—Data recall is a data access protocol by which hot nodes retrieve the data backing a tiered file from a cold node on demand as end-user data access requires it.

Stable Version—When a hot node opens a tiered file, a stable version is a snapshot or recallable (logical) instance of the data backing that tiered file on the cold node that exists for the lifetime of the open on the hot node. That is, a stable version is a snapshot (a read-only copy of a data set frozen at a point in time) of content of a particular version of the file on the cold node, where the particular version is immutable, and where the snapshot is a recallable instance of data backing the file on the cold node while the file is being used on the hot node.

Live version—A live version of a file is a version of the file on the cold storage that includes most recent changes made to the file that are synced with the hot nodes and is the version that is presented to a hot node from the cold storage when the hot node accesses the file. For example, the stable version of a file backing data recall is the live version of the file in cold storage. Also, if a copy of a tiered file's content is not created in the cold storage, then the live version of the file in the cold storage plays the role of a stable version while the tiered file is open on a hot node.

Conflict—A conflict occurs in a data synchronization community when a file in a data set is modified concurrently on two different nodes. The synchronization system needs to have some mechanism to resolve such conflicts, but in general avoiding conflicts is desirable.

Change Detection—This is a mechanism by which a node in the data synchronization community detects that a data set has been modified locally so that those changes can by propagated to other nodes in the community.

Note that the distinction between cold and hot nodes is presented above as a bright-line distinction, i.e., a node is either cold or hot with reference to a particular data set, but does not play both roles. This distinction, however, is a convenient simplification for the purposes of the present disclosure, and there is nothing in the present disclosure that makes this distinction a requirement. For example, one could imagine a data set replicated across branch offices via data synchronization, with each branch office having disjoint access patterns and, therefore, disjoint notions of which files are most frequently used. In such a situation, the ideas captured by the present disclosure could be used to have a node act as cold storage for other nodes on those parts of the data set that the node accesses frequently (i.e., what is hot for node A may be cold for node B), and vice versa.

Now an overview of the systems and methods for storing data according to the present disclosure is presented. Commonly, in existing hierarchical storage management (HSM) solutions, the low-cost storage medium for cold files is read-only and often in a proprietary format that users cannot interact with directly. Data synchronization solutions, on the other hand, involve replication of a data set across all nodes in the sync community, which enables responsive end-user access across geographies or other boundaries, although each node incurs the full cost for storing the data set.

The present disclosure encompasses mechanisms by which the cold storage tier (e.g., cloud storage) can present read/write accessibility to end-users while providing reliable read/write access to tiered files on other nodes (e.g., on-premises servers). With the advent of public cloud, some HSM solutions use the cloud as the low-cost storage tier, but the cloud-side data is not accessible to end-users. Although not limited to a deployment involving a public cloud tier, the systems and methods of the present disclosure bring the benefits of both solutions together and make the low-cost storage tier (e.g., cloud storage) a node in the data synchronization community. This provides direct access to end-users via network file sharing protocols (e.g., Server Message Block (SMB) protocol) and Application program interfaces (APIs) (e.g., Representational State Transfer (REST)) APIs. The direct access to end-users is provided while using the same data set as cold storage for replicated copies of the data hosted on on-premises file servers.

The solutions of the present disclosure allow concurrent opens and edits of a tiered file across nodes in a data synchronization community without pulling all the data backing a tiered file down to the local node first. This feature is advantageous when considering a workload that makes small, localized (in terms of ranges of data in the file) edits to large files where losing edits is not acceptable.

Another advantageous feature is the sharing of cold storage for multiple copies of the data in hot storage. Existing hierarchical storage management (HSM) solutions pair a single presentation of the data on a hot tier with the read-only, proprietary cold storage tier, whereas the solutions described below present multiple instances of the data on the hot tier with a read/write presentation (for end users) of the data on the cold tier.

One of the key technological challenges solved by the present disclosure is allowing write access to the cold storage tier in an HSM solution without losing access to tiered files on other nodes in a data synchronization community. In particular, if a tiered file is on node A and the cold storage content for the file is in the replica of the data set on node B, the challenge is how does node A present a coherent version of the tiered file's content to programs running on node A if there are concurrent writes occurring against the file on node B. The present disclosure proposes the following two mutually non-exclusive solutions for this technological challenge. An overview of both solutions is first presented below. Both solutions are described in detail later.

An overview of the first solution according to the present disclosure follows. In the first solution, the content of a tiered file is backed by a stable version on the cold node. A stable version is functionally a copy of the content of a specific version of a file on the cold node that will not change or be deleted while there is a tiered file on a hot node that requires this version of the content. The creation of the stable version can occur at different times as follows.

For example, a stable version of a regular file's content on the cold node can be created at the time the regular file is converted to a tiered file on a hot node. In another example, a stable version of a tiered file's content on the cold node can be created at the time the tiered file is opened by an end-user application on a hot node. The creation of the stable version could be deferred until after the open, and be triggered by the first read on the hot node (but opens (for write) on the cold node would also have to trigger the creation of a stable version). In yet another example, a stable version of a regular file's content on the cold node can be created in advance of the conversion of that file to a tiered file.

In addition to creating stable version on the cold node, the first solution provides methods of identifying and locating stable versions on the cold node for data recall. Multiple mechanisms can be used for identifying and locating stable versions on the cold node. Two examples of the mechanisms follow.

For example, namespace location plus file system concurrency checks may be used for identifying and locating stable versions on the cold node. Since the storage on the cold node is a live file system, one way to identify and locate a stable version is via its namespace location in the data set along with whatever concurrency information is necessary to determine that the file contains the correct content for a tiered file on a hot node.

As another example, a unique identifier for a file in the data synchronization community plus a desired version of that file from a sync perspective may be used for identifying and locating stable versions on the cold node. For example, the unique identifier can be a 64-bit integer plus a GUID, and the desired version can be a GUID (called a stream identifier). Identifying a stable version of a file via its unique identity in the sync community versus its namespace location has an advantage of being able to relocate a stable version if its namespace location has been modified via renames (of the file itself or a parent directory) or via a move (of the file itself or a parent directory). However, this relocation mechanism depends on change detection to detect the renames or moves before the new location can be resolved.

An overview of the second solution according to the present disclosure is now presented. In the second solution, the tiered files are always synced to the version on the cold node prior to the completion of an open of the file on a hot node. This can be achieved in multiple ways. For example, a single-file change detection mechanism can be used to detect any changes to the file on the cold node prior syncing the file to the hot node. This is different than change detection in a sync system since normally change detection in a sync system is interested in changes across the data set as a whole rather than being focused on a single file. Further, as explained below in detail, a single-file synchronization method can be used to bring the latest version of a tiered file's metadata (i.e., the size, file attributes, but not the content) down to the hot node.

In some implementations, a distributed lock may be created on the tiered file's content to ensure that the version on the cold node remains unchanged while the file is open on the hot node. This lock could take two forms. For example, a lock may be created on the tiered file between just the cold node and the hot node that opened the file. This would allow concurrent modifications on other hot nodes that would lead to conflicts. As another example, a lock may be created on the tiered file across all nodes in the data synchronization community. This would prevent concurrent modifications that lead to conflicts. These and other aspects of the present disclosure are described below in detail.

FIG. 1 shows a simplified example of a distributed computing system 100 for storing data by combining the hierarchical storage management (HSM) and data synchronization solutions according to the present disclosure. The system 100 can implement both solutions according to the present disclosure as outlined above and as described below in detail. The system 100 can ensure that the content of a tiered file is backed by a stable version on the cold node. The system 100 can also ensure that the tiered files are always synced to the version on the cold node prior to the completion of an open of the file on a hot node. A brief discussion of the system 100 follows. A detailed description of the system 100 is provided after describing a cloud computing system with reference to FIGS. 4-6, which can at least partly implement the system 100.

The system 100 comprises multiple nodes 120-1, 120-2, . . . , and 120-N, where N is an integer greater than one (collectively nodes 120), and a node 130. The nodes 120 and 130 communicate with each other and with other systems (e.g., a cloud computing system 200 shown and described with reference to FIGS. 4-6 below) via a distributed communications system 110. For example, the node 130 (and/or one or more nodes 120) may be located in the cloud (e.g., in the cloud computing system 200 shown and described with reference to FIGS. 4-6 below).

The distributed communications system 110 may include a local area network (LAN), a wide area network (WAN) such as the Internet, or other type of network. The nodes 120 and 130 may connect to the distributed communications system 110 using wireless and/or wired connections.

For illustrative purposes and simplicity of discussion, the nodes 120 are shown with respective hot storage 122, and the node 130 is shown with cold storage 132. However, the nodes 120 and 130 need not comprise hot storage 122 only and cold storage 132 only as shown. The hot storage 122 may also be referred to as a first storage medium or hot storage tier. The cold storage 132 may also be referred to as a second storage medium or cold storage tier. For simplicity of discussion, one of the nodes 120 will be called a hot node 120, and the node 130 will be called a cold node 130. However, it should be understood that these categories are relative as explained above in the description of the terminology.

Any of the nodes 120 and 130 may be located on-premises and/or in the cloud (e.g., in the form of nodes 272 shown and described with reference to FIGS. 4-6 below). Also, the cold storage 132 may be located on-premises and/or in the cloud (e.g., in clusters 234 in datacenters 214 shown and described with reference to FIGS. 4-6 below). The nodes 120 and 130 may be located at different geographical locations and can access the cold storage 132 via the distributed communications system 110.

The nodes 120 and 130 form a data synchronization community (explained above). The hot storage 122 and the cold storage 132 are part of a hierarchical storage management (HSM) solution. Together, the nodes 120 and 130, and the hot and cold storage 122, 132 combine the data synchronization solution and the HSM solution according to the present disclosure as outlines above and as described below in detail.

Figure 3:
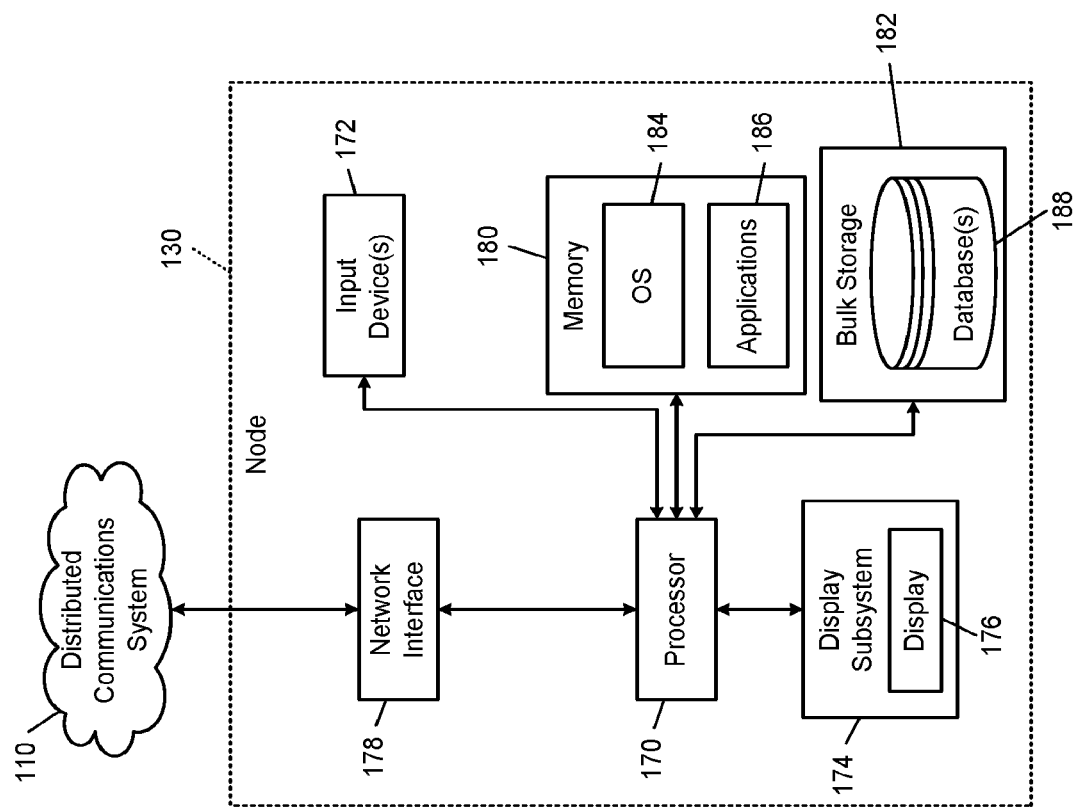
FIG. 3 is a functional block diagram of a simplified example of a node comprising cold storage in the distributed computing system of FIG. 1.

The nodes 120 and 130 are computing devices and may also be called machines, servers, hosts, and so on. Nodes are to be understood broadly as representing computing devices with one or more processors and memory configured to execute machine readable instructions. In some examples, the nodes 120 and 130 may also include smartphones, personal digital assistants (PDAs), laptop computers, personal computers (PCs), etc. The nodes 120 and 130 may execute software applications developed by one or more vendors. The nodes 120 and 130 may host multiple databases that are relied on by the software applications. Applications and computer programs are to be understood broadly as representing machine readable instructions executable by the computing devices. Examples of configurations of the nodes 120 and 130 are shown in FIGS. 2-3.

Figure 2:
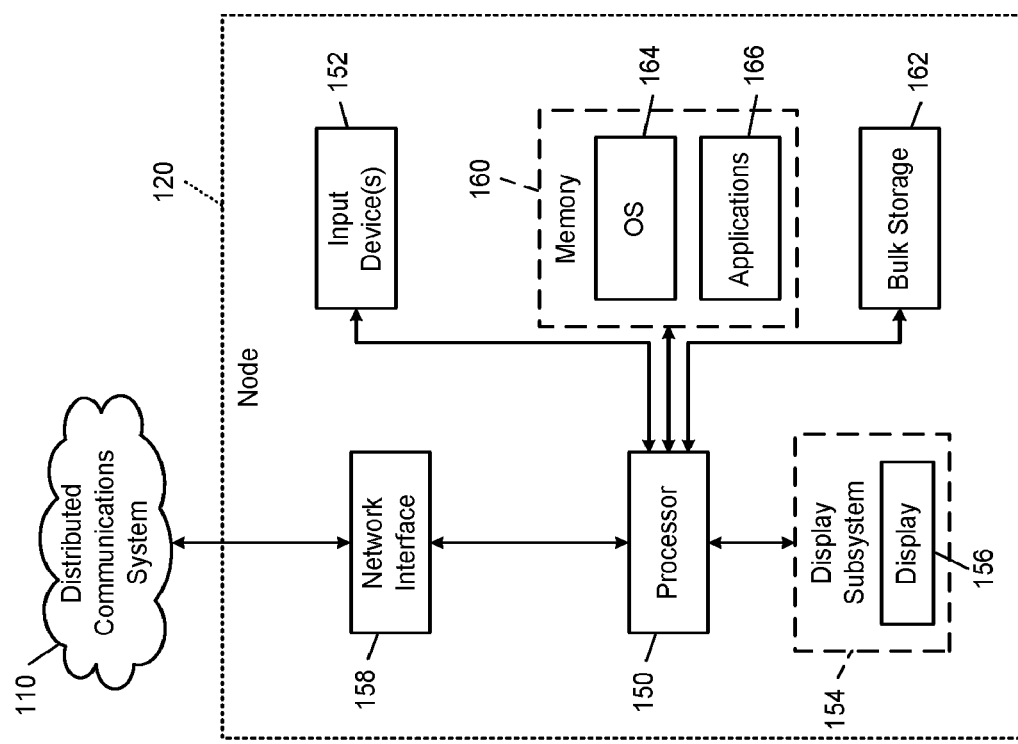
FIG. 2 is a functional block diagram of a simplified example of one of the nodes comprising hot storage in the distributed computing system of FIG. 1.

FIG. 2 shows a simplified example of one of the nodes 120 (hereinafter node 120). The node 120 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the node 120 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices. The bulk storage 162 may be hot storage 122 (see the description of hot storage in the explanation of the terminology above).

The processor 150 of the node 120 executes an operating system (OS) 164 and one or more applications 166, which may include one or more methods or portions thereof described below with reference to FIGS. 7-10. The applications 166 may also include an application that accesses other nodes 120 and the node 130 as well as the cold storage 132 via the distributed communications system 110.

FIG. 3 shows a simplified example of the node 130. The node 130 is similar to the nodes 120 except that the node 130 comprises and/or controls cold storage 132 (see the description of cold storage in the explanation of the terminology above). The node 130 typically includes one or more CPUs or processors 170, a network interface 178, memory 180, and bulk storage 182. In some implementations, the node 130 may be a general-purpose server and include one or more input devices 172 (e.g., a keypad, touchpad, mouse, and so on) and a display subsystem 174 including a display 176.

The network interface 178 connects the 130 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices. The bulk storage 182 is described in further detail below.

The processor 170 of the 130 executes an operating system (OS) 184 and one or more applications 186, which may include one or more methods or portions thereof described below with reference to FIGS. 7-10. The applications 186 may also include an application that accesses the nodes 120 and other systems that may provision the cold storage 132 (e.g., the cloud computing system 200 shown in FIGS. 4-6) via the distributed communications system 110.

The bulk storage 182 may store one or more databases 188 that store data structures used by the applications 166 and 186 to perform respective functions. The bulk storage 182 may be cold storage 132 (see the description of cold storage in the explanation of the terminology above). Although shown as part of the node 130, the bulk storage 182 may be located in whole or in part on-premises and/or in the cloud (e.g., in clusters 234 in datacenters 214 shown and described with reference to FIGS. 4-6 below). The nodes 120 and 130 can access the bulk storage 182 via the distributed communications system 110. Further, the node 130 can access the nodes 120 and the hot storage 122 via the distributed communications system 110.

Since the cold storage 132 may be located in the cloud, an example of a cloud computing system (CCS) 200 that can provision the cold storage 132 is described below with reference to FIGS. 4-6. Further, the cloud computing system (CCS) 200 may also provision the nodes 120 and/or 130 that can be hot and/or cold nodes 120, 130.

Figure 4:
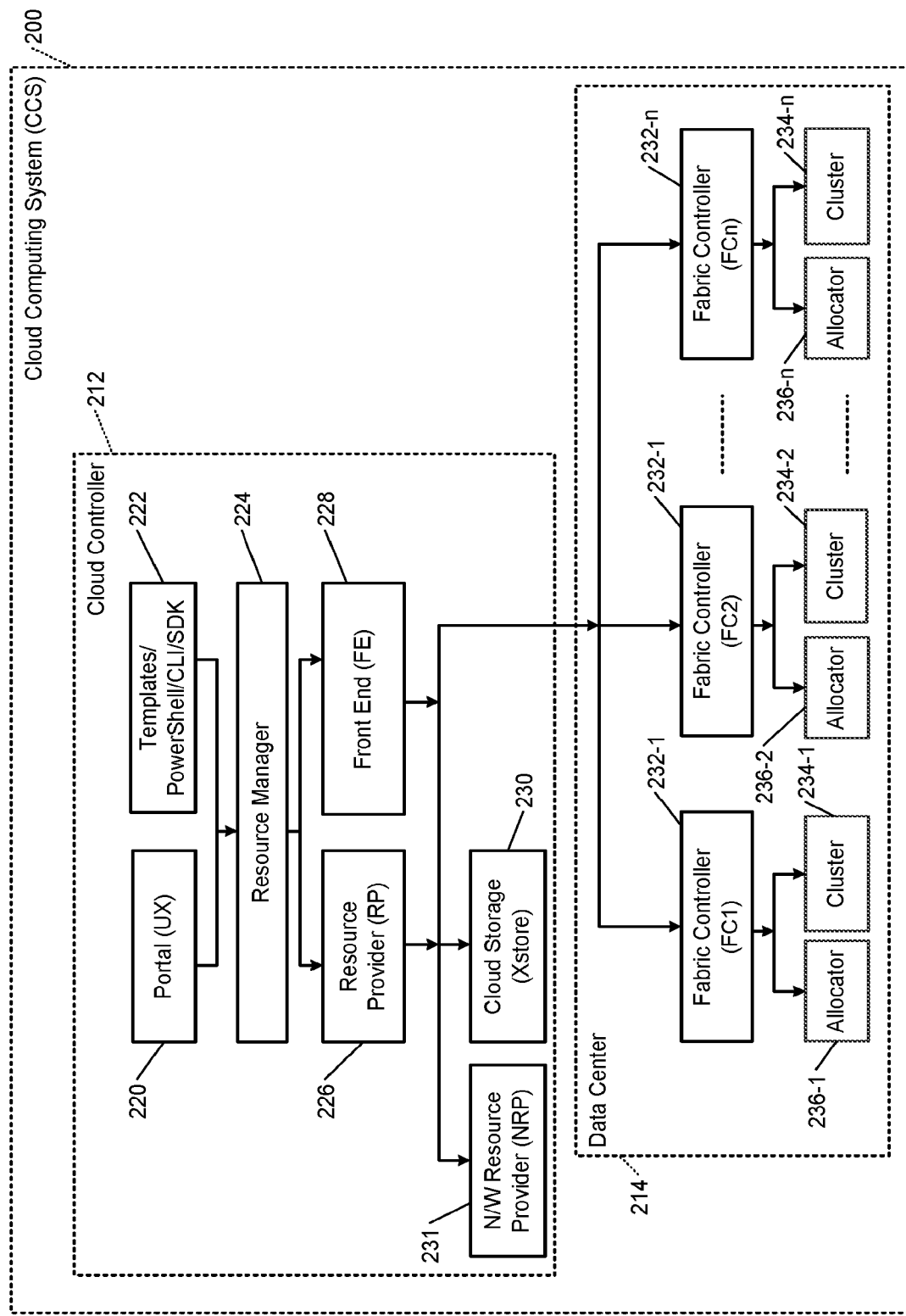
FIG. 4 is a functional block diagram of a simplified example of a cloud computing system.

FIG. 4 shows a simplistic example of a cloud computing system (CCS) 200 that can partly or fully implement the system 100 shown in FIG. 1 for storing data by combining the hierarchical storage management (HSM) and data synchronization solutions according to the present disclosure. The CCS 200 includes a cloud controller 212 and at least one datacenter 214. While only one datacenter 214 is shown for simplicity, the cloud controller 212 can interface with a plurality of datacenters. Further, while the datacenter 214 is shown as being local to the cloud controller 212, one or more datacenters may be geographically remote from the cloud controller 212, may be located in different geographic locations (e.g., in different time zones, different countries or continents, and so on), and may communicate with the cloud controller 212 via various networks.

Each datacenter 214 includes a plurality of fabric controllers 232-1, 232-2, . . . , and 232-*n* (collectively fabric controllers 232) and corresponding clusters 234-1, 234-2, . . . , and 234-*n* (collectively clusters 234). Each fabric controller 232 controls a respective cluster 234. Each cluster 234 includes a plurality of racks (shown in FIGS. 5-6), and each rack includes a plurality of nodes (shown in FIG. 6), which are also called servers, hosts, or machines throughout the present disclosure. Each fabric controller 232 is associated with an allocator 236 that allocates resources within the cluster 234 for instances of customer services hosted on the cluster 234.

The cloud controller 212 includes a portal 220 and a software development kit (SDK) 222 that the customers can use to select resources and request service deployment. The cloud controller 212 further includes a cloud resource manager 224, a compute resource provider 226, and a front-end 228. The front-end 228 interfaces with the fabric controllers 232. The cloud resource manager 224 receives the customer selections and forwards the customer selections to the compute resource provider 226. The compute resource provider 226 generates a tenant model based on the customer selections. The compute resource provider 226 provisions resources to the customer services according to the tenant model generated based on the customer selections. The compute resource provider 226 provisions storage, networking, and computing resources by interfacing with a cloud storage (Xstore) 230, a network resource provider 231, and the fabric controllers 232.

Figure 5:
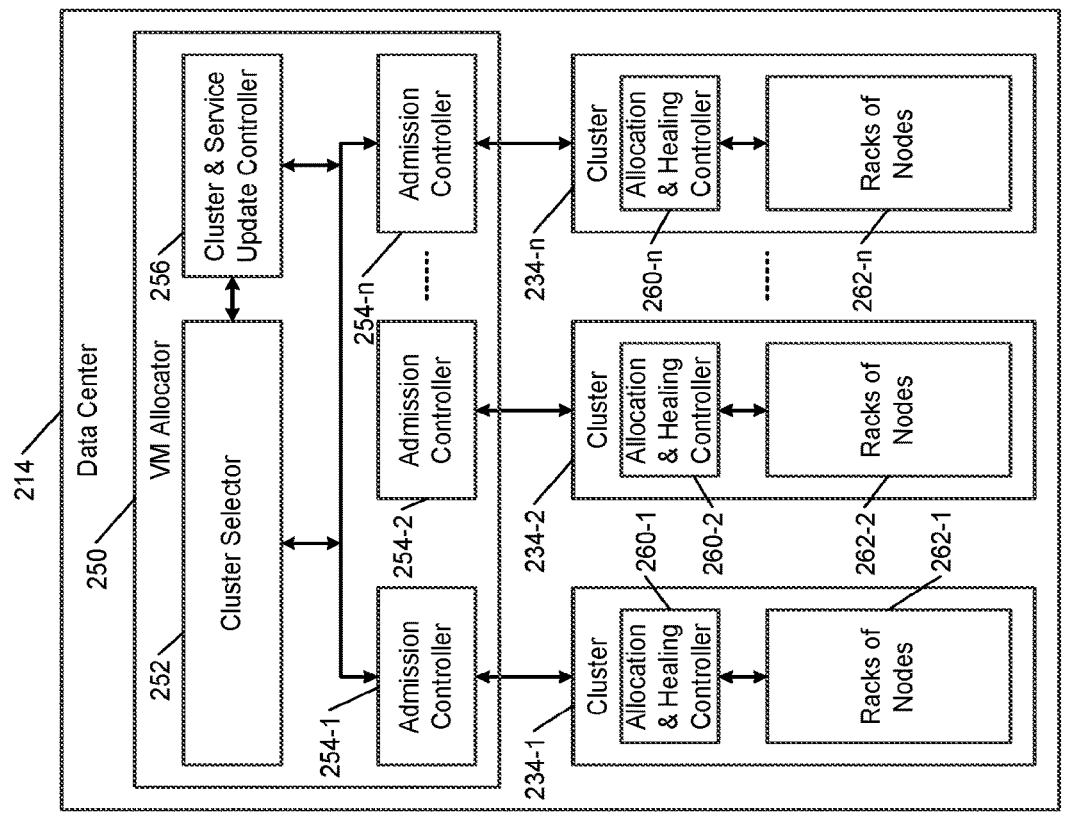
FIG. 5 is a functional block diagram of a simplified example of a datacenter shown in FIG. 4.

FIG. 5 shows a simplistic example of the datacenter 214 shown in FIG. 4. The datacenter 214 includes a VM allocator 250 and the clusters 234. The VM allocator 250 includes a cluster selector 252 and a plurality of admission controllers 254-1, 254-2, and . . . , and 254-n (collectively admission controllers 254). Each admission controller 254 is associated with a corresponding cluster 234. Each cluster 234 includes an allocation and healing controller 260 (shown as allocation and healing controllers 260-1, 260-2, . . . , and 260-n; one allocation and healing controller per cluster) and one or more racks 262 of nodes (also called servers, hosts, or machines; and shown as racks 262-1, 262-2, . . . , and 262-n). The allocation and healing controller 260 can implement the VM allocator 236 of FIG. 4.

When allocating a VM, the VM allocator 250 selects one of the clusters 234 in which to allocate a VM in association with the corresponding admission controller 254. After the VM allocator 250 selects one of the clusters 234 to allocate the VM, the allocation and healing controller 260 of the selected cluster 234 places the VM on one or more of the nodes in one or more of the racks 262 in the selected cluster 234 depending on the number of update and fault domains and other resources specified by the customer. Based on VM activity in the clusters 234, a cluster and service update controller 256 provides updates to the cluster selector 252. For example, the VM activity may include activation and termination of one or more VM's in the clusters 234. The cluster and service update controller 256 may also provide updates to the cluster selector 252 regarding utilization of growth buffers due to service scale out and utilization of healing buffers due to node/rack failures.

Figure 6:
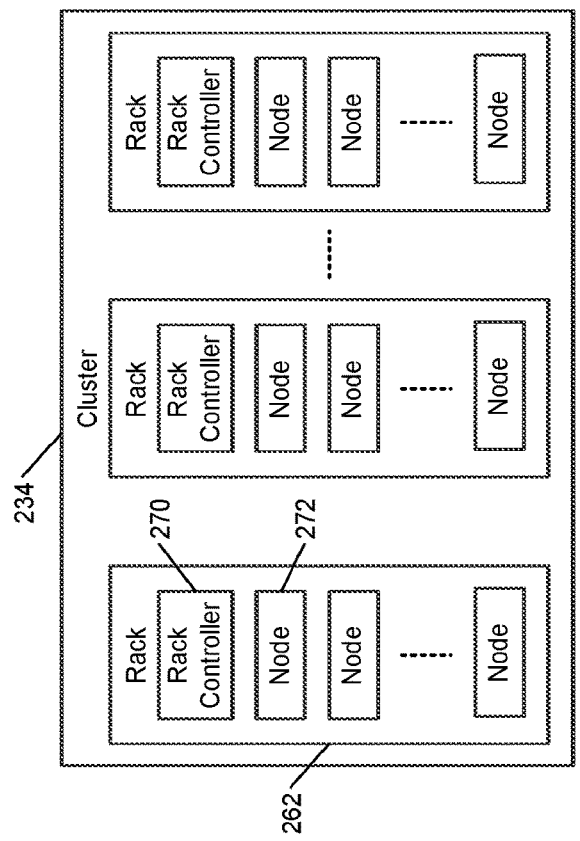
FIG. 6 is a functional block diagram of a simplified example of a cluster shown in FIG. 5.

FIG. 6 shows an example of the cluster 234 shown in FIGS. 4-5. Each cluster 234 includes the plurality of racks 262. Each rack 262 includes a rack controller 270 and a plurality of nodes 272. Each rack controller 270 includes a power controller that controls power allocation to the plurality of nodes 272 in the rack 262.

As mentioned above, the cloud computing system (CCS) 200 can provision the nodes 120 and/or 130. For example, one or more nodes 72 shown in FIG. 6 can be the nodes 120 and/or 130 of the system 100 shown in FIGS. 1-3. The CCS 200 can also provision the cold storage 132 of the system 100 shown in FIG. 1. For example, the clusters 234 shown in one or more data centers 214 can provision the cold storage 132 of the system 100 shown in FIG. 1. Thus, the CCS 200 can at least partly implement the system 100 shown in FIG. 1 for storing data by combining the hierarchical storage management (HSM) and data synchronization solutions according to the present disclosure.

Below is a detailed description of the two mutually non-exclusive solutions provided by the system 100: The first solution ensuring that the content of a tiered file is backed by a stable version on the cold node 130, and the second solution ensuring that the tiered files are always synced to the version on the cold node 130 prior to the completion of an open of the file on a hot node 120.

In the first solution, the system 100 ensures that the content of a tiered file is backed by a stable version on the cold node 130 as follows. Three approaches are described below. All of the approaches described below put one or both of the following requirements on the cold storage 132 in order to be cost-effective and responsive to end-user actions on the hot nodes 120. A first requirement is that storing multiple versions of a file's content from different points in time in cold storage 132 is more cost-effective than adding extra storage to the hot nodes 120 in order to forego converting regular files to tiered files. Note that the cost here means the full lifecycle costs of adding storage to hot nodes 120 which includes planning, deployment, maintenance, and eventual replacement of old hardware. A second requirement is that making a copy of a file on cold storage 132 is fast, ideally a constant time function of file size. For example, this could be done using a copy-on-write technique where a true copy of a range of data in a file is only made when that range diverges (due to a write) between two or more copies of the file.

In a first approach, a stable version of a regular file's content can be created on the cold node 130 at the time it is converted to a tiered file on a hot node 120 as follows. This approach depends on the ability of the system 100 to store multiple versions of a file's content from different points in time in cold storage 132 rather than adding extra storage to the hot nodes 120 (i.e., the first requirement described above), and on communication from a hot node 120 to the cold node 130 prior to converting a regular file on the hot node 120 to a tiered file. The cold node 130 would make a copy of the file and report the result back to the hot node 120; and on success, the file could be converted to a tiered file on the hot node 120.

Generally speaking, this approach requires the version of the file to be in sync between the hot and cold nodes 120, 130 although other techniques described below in the second solution could be used to ensure that the hot and cold nodes 120, 130 are in sync prior to making a copy of the file on the cold node 130 and converting it to a tiered file on the hot node 120. A file would generally only be converted to a tiered file if it had not been changed recently, in which case the hot and cold nodes 120, 130 would necessarily be in sync. There may be race conditions to guard against, but guards could be used to abort the conversion to a tiered file.

In a second approach, a stable version of a tiered file's content can be created on the cold node 130 at the time the tiered file is opened by an end-user application on a hot node 120 (or on the first read). In contrast to the first approach, deferring the creation of a stable version until the user opens a tiered file on the hot node 120 defers the additional costs of creating the stable version on the cold node 130 until the time at which it is absolutely needed. Under the assumption that regular files are only converted to tiered files on the hot node 120 when they haven't been accessed recently (and by implication likely won't be accessed soon), a tiered file may never be opened on the hot node 120 and the cost of creating a stable version on the cold node 130 can be avoided altogether.

However, deferring the creation of the stable version until the file is opened on the hot node 120 has a cost. For example, at the time of opening a tiered file on the hot node 120, the file may have already changed on the cold node 130 or may be in the process of changing. If the file has already changed on the cold node 130, then the techniques described below in the second solution can be used to get the logical view of the tiered file on the hot node 120 in sync with the cold node 130 in addition to creating a copy on the cold node 130 in order to have a stable version of the tiered file's content available for the duration of the interaction with the file on the hot node 120.

If the file is in the process of being changed on the cold node 130, then the open on the hot node 120 must be held until the file is closed on the cold node 130 or a sharing violation error can be returned to the application trying to open the tiered file. Given these complexities and the end-user experience they imply, this approach is more appropriate when modifications on the cold node 130 are rare or disjoint in time from activity on the hot nodes 120. Note that this approach depends on the ability of the system 100 to make a copy of a file on cold storage 132 fast (i.e., the second requirement described above) in order to provide a responsive user experience for opens of tiered files on the hot nodes 120.

In a third approach, a stable version of a regular file's content can be created on the cold node 130 in advance of the conversion of that file to a tiered file on a hot node 120. This approach automatically creates stable versions of files on the cold node 130 in advance of their conversion to a tiered file on the hot nodes 120. This approach depends on the ability of the system 100 to store multiple versions of a file's content from different points in time in cold storage 132 rather than adding extra storage to the hot nodes 120 (i.e., the first requirement described above), so that this up-front creation of copies of files in cold storage 132 is inexpensive enough that it can be done for files that may or may not be converted to tiered files on the hot nodes 120.

In this approach, the system 100 can use a namespace-level snapshot feature to periodically create a stable version of an entire data set (theoretically in constant time as a function of the size of the data set). The namespace-level snapshot feature may also be called a file system namespace level snapshot feature or a file share level snapshot feature. The hot nodes 120 can then depend on the existence of these snapshots to support data recall of tiered files even if the live version of the file in cold storage 132 has been modified or is in the process of being modified. Note that this approach requires some coordination between the hot and cold nodes 120, 130 so that the hot nodes 120 are aware of what stable versions of files exist in cold storage 132 prior to a hot node 120 converting a regular file to a tiered file.

In addition to creating stable version on the cold node 130, the first solution provides ways for identifying and locating stable versions on the cold node 130 for data recall. Stable versions in cold storage 132 are only useful for data recall if they can be located by hot nodes 120. Multiple techniques can be used for identifying and locating stable versions on the cold node 130. Two examples of the techniques follow.

For example, given that the system 100 combines data synchronization and hierarchical storage management (HSM) solutions, the namespace location of a file is a shared identifier for a file across hot and cold nodes 120, 130. Since files can be renamed and moved, under certain race conditions, the namespace location is not sufficient for identifying that a version of a file in cold storage 132 is the same version that a hot node 120 needs for data recall purposes. Additional concurrency information is needed to uniquely identify the needed stable version. A variety of techniques could be used, for example, hashes of file content, comparisons of file creation time, last write time and file size, or functionality provided by the underlying file system that makes such concurrency checks 100% accurate and efficient. For example, an Entity Tag (ETag) can be assigned to each version of a file in order to locate the correct stable version of a file for data recall purposes. Further, a unique and namespace location independent identifier (called a global ID) can be assigned by the data synchronization component to identify a tiered file of interest across the hot and cold nodes 120, 130.

In the second solution, the system 100 ensures that the tiered files are always synced to the version on the cold node 130 prior to the completion of an open of the file on a hot node 120. Following this approach to its logical conclusion deals with concurrent changes across the hot and cold storage tiers 122, 132 by eliminating the possibility of concurrent changes from the system. This means that the stable version of a file backing data recall is actually the live version of the file in cold storage 132. However, in order to be able to take this approach to its logical conclusion, detection of changes to a data set in cold storage 132 needs to be fast. Otherwise the latencies involved in holding the open of a file on the hot node 120 can be unreasonable.

Any of the following two approaches can reduce the frequency of conflicts due to concurrent file changes in hot and cold storage 122, 132. In a first approach, single-file change detection is used to detect any changes to the file on the cold node 130 prior syncing the file to the hot node 120 as follows. Suppose a tiered file is being opened on a hot node 120, and there has been a modification to the file in the cold storage 132 that has not been detected yet and synced to the rest of the data synchronization community. In order to sync the tiered file to the latest version in the cold storage 132 before the open completes on the hot node 120, the change needs to be detected first.

For example, possible changes to a file fall into three major categories: First, a change can include modification of a file's content or other properties except for the file's name and or parent directory; second, a change can include modification of a file's name or parent directory; and third, a change can include deletion of the file. Detecting changes encompassed by the first category is the easiest since the file can be opened at its last known namespace location, and any differences between the file's current state and the state that was last synced can be detected. Detecting the other types of changes quickly depends on help from the underlying file system of the cold storage 132 since the file can no longer be opened at the namespace location that was last synced for the file.

If the underlying file system of the cold storage 132 cannot detect changes in the cold storage 132 quickly enough, a hybrid solution combining this first approach or the following second approach with the creation of stable versions for tiered files can be used. The purpose of using single-file change detection in such a hybrid solution is not to enable data recall (that is what the stable versions do), but to diminish the frequency of conflicts due to undetected changes in the cold storage 132.

In the second approach, single-file synchronization can be used to bring the latest version of a tiered file's metadata (i.e., the size, file attributes, but not the content) down to the hot node 120. If single-file change detection described in the first approach above finds a change to a file in the cold storage 132, these changes (minus the content) can be synced down to the hot node 120 before the open of the file can complete on the hot node 120. The most obvious cases demonstrating why this is necessary are that the file's size has been changed in the cold storage 132, or the file has been deleted from the cold storage 132.

If these state changes are not synced from the cold node 130 to the hot node 120 before the open is allowed to complete, a coherent logical view of the file cannot be presented by the system to the process that opened the file. For example, if the file was deleted from cold storage 132, then a 'file not found' error needs to be returned from the open of a file rather than allowing the open of a file that no longer exists to go through. Similarly, the file sizes have to be in sync between the hot and cold nodes 120, 130. Otherwise there will be too little or too much data in cold storage 132 backing the logical view of the file presented to the process doing the open on the hot node 120.

In a third approach, a distributed lock can be created on the tiered file's content to ensure that the version on the cold node 130 remains unchanged while the file is open on the hot node 120 as follows. If a solution is not going to create a copy of a tiered file's content in the cold storage 132 under any circumstances (using any of the above approaches), then the live version of the file in the cold storage 132 has to play the role of a stable version while the tiered file is open on a hot node 120. This means that the solution has to use a distributed lock between the hot and cold nodes 120, 130 to block all modifications to the file in the cold storage 132 while the file is open on the hot node 120 (although an open of a file on the hot node 120 that allows shared write access to the file can complicate matters).

Also, depending on the time at which the distributed lock is dropped for a file, the content of the tiered file would need to be fully recalled to the hot node 120 to make sure no data modifications were lost. For example, if the distributed lock is dropped when the file is closed on the hot node 120, then the content backing the file would need to be fully recalled before the close of the tiered file is allowed to complete. Before the distributed lock is dropped for a file, to make sure no data modifications are lost, the file is synced with the hot node 120 (not recalled but synced); or preferably, to avoid unnecessary data recall to the hot storage 122, the pointer on the hot storage 122 is updated to address the new version on the cold storage, which is essentially a sync of metadata-only, including any metadata needed to update the pointer. Otherwise, the file might be changed in the cold storage 132 immediately after the lock is dropped before the data change made on the hot node 120 could be synced to the cold node 130. Another option would be to hold the distributed lock until the changes to the tiered file made on the hot node were synced to the cold node 130. This would require the cold node 130 to be able to act in some sort of super user mode in order to modify the file in cold storage 132 despite the fact that the distributed lock is held.

FIGS. 7-10 show various examples of methods for storing data by combining the hierarchical storage management (HSM) and data synchronization solutions according to the present disclosure. In the following description, the term control refers to one or more applications (e.g., applications 166 and 186 described below with reference to FIGS. 1-3), which implement the system 100 described above and the methods described below. In other words, the term control represents code or instructions executed by the nodes 120 and 130 of the system 100 shown in FIGS. 1-3 and/or by one or more components of the cloud computing system 200 shown in FIGS. 4-6 to perform the described functionality.

Figure 7:
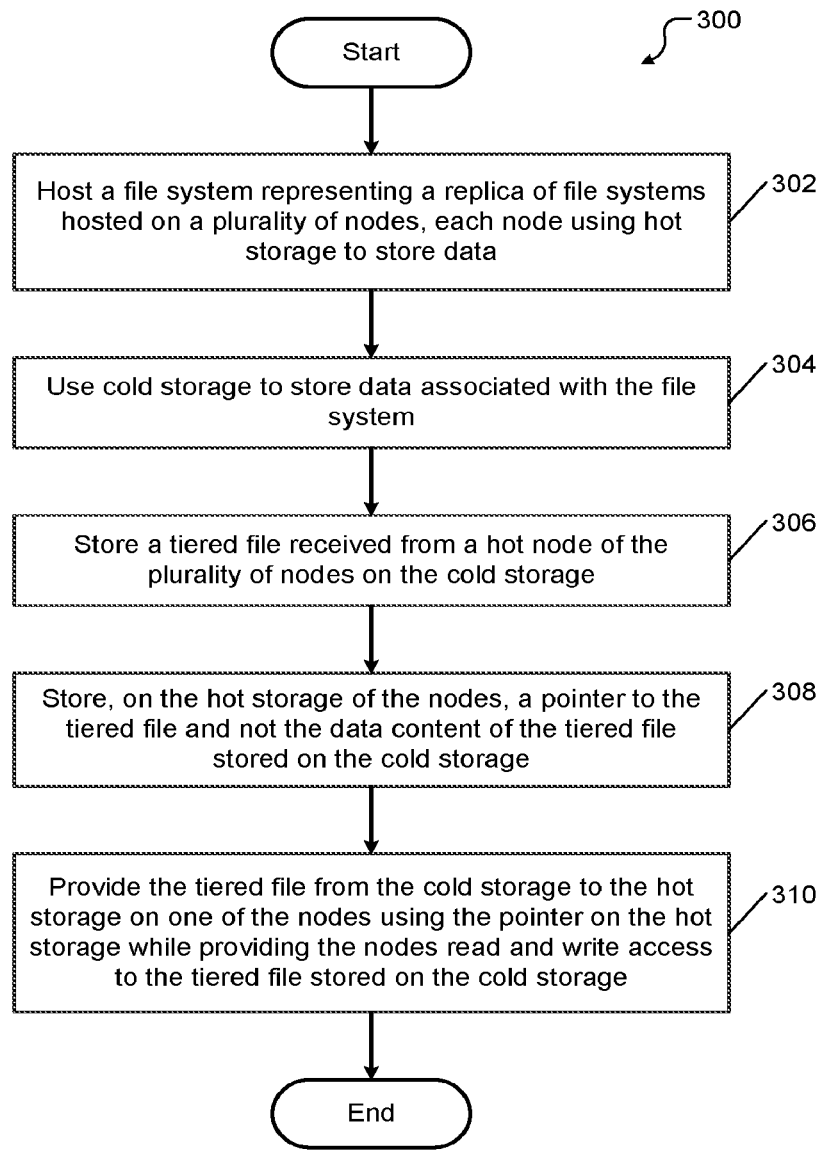
FIG. 7 shows a flowchart of a method for storing data on the distributed computing system of FIG. 1 by combining the hierarchical storage management (HSM) and data synchronization solutions according to the present disclosure.

FIG. 7 shows a method 300 for storing data by combining the hierarchical storage management (HSM) and data synchronization solutions according to the present disclosure. At 302, control (e.g., application 186 on the node 130 shown in FIG. 3) hosts a file system representing a replica of filesystems hosted on a plurality of nodes (e.g., nodes 120 shown in FIG. 1), each node using hot storage (e.g., hot storage 122 shown in FIG. 1) to store data. At 304, control uses cold storage (e.g., cold storage 132 shown in FIG. 1) to store data associated with the file system.

At 306, control stores a tiered file received from a hot node (e.g., a node 120) on the cold storage. At 308, control stores, on the hot storage of the nodes (e.g., nodes 120), a pointer to the tiered file and not the data content of the tiered file stored in the cold storage. At 310, control provides the tiered file from the cold storage to the hot storage on one of the nodes (e.g., nodes 120) using the pointer on the hot storage while providing the nodes read and write access to the tiered file stored on the cold storage.

Figure 8:
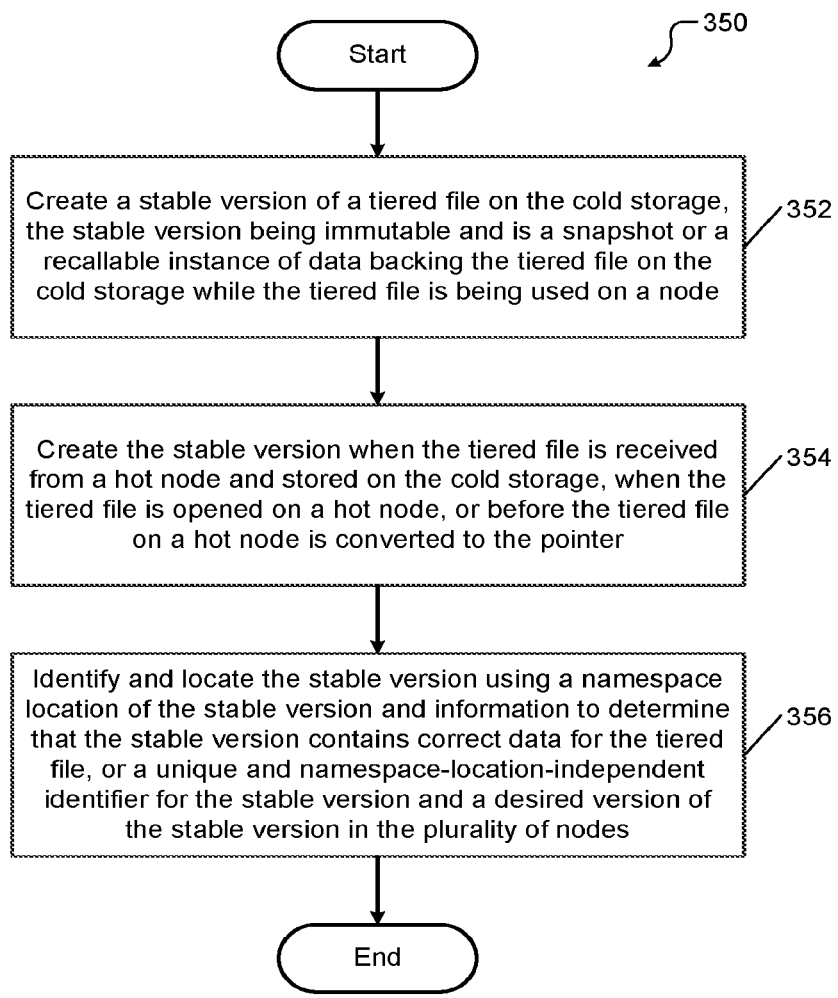
FIG. 8 shows a flowchart of a method for creating a stable version of a tiered file on the distributed computing system of FIG. 1 according to the present disclosure.

FIG. 8 shows a method 350 for creating a stable version of a tiered file according to the present disclosure. The stable version is used when providing the tiered file from the cold storage to the hot storage on one of the nodes (e.g., nodes 120) as described above at 310 with reference to method 300.

At 352, control (e.g., application 186 on the node 130 shown in FIG. 3) creates a stable version of a tiered file on the cold storage. The stable version is immutable and is a snapshot or a recallable instance of the data backing the tiered file on the cold storage while the tiered file is being used on a node (e.g., a node 120). At 354, control creates the stable version when the tiered file is received from a hot node (e.g., a node 120). For example, control creates the stable version when the tiered file is opened on a hot node or before the tiered file on a hot node is converted to a pointer.

At 356, control provides the ability to identify and locate the stable version. For example, control identifies and locates the stable version by using a namespace location of the stable version and by using information to determine that the stable version contains correct data for the tiered file. Alternatively, control identifies and locates the stable version by using a unique and namespace location independent identifier for the stable version and by using a desired version of the stable version in the plurality of nodes.

Figure 9:
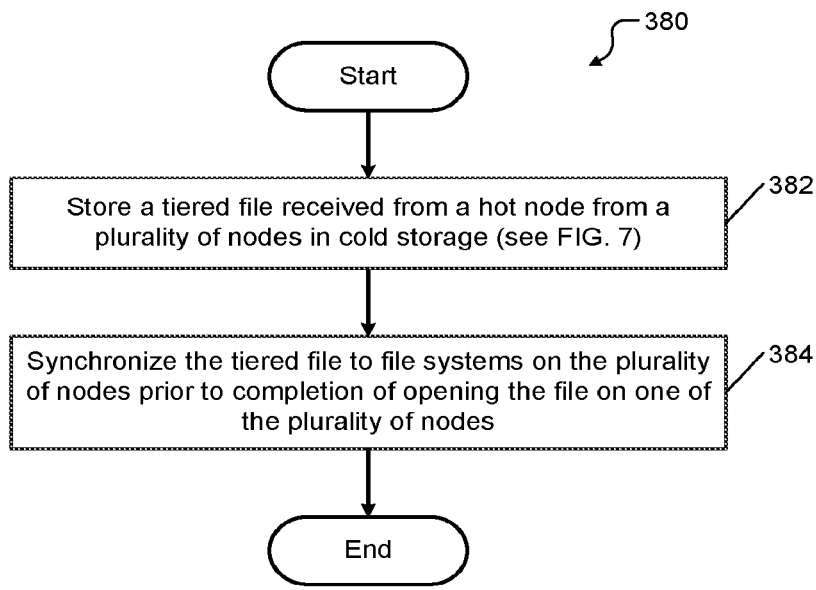
FIG. 9 shows a flowchart of a method for synchronizing the tiered file to the filesystems on the plurality of nodes of the distributed computing system of FIG. 1 according to the present disclosure.

FIG. 9 shows a method 380 for synchronizing the tiered file to the filesystems on the plurality of nodes (e.g., nodes 120) according to the present disclosure. The method 380 is performed in addition to the method 300 shown in FIG. 7 to store data by combining the hierarchical storage management (HSM) and data synchronization solutions according to the present disclosure.

At 382, control (e.g., application 186 on the node 130 shown in FIG. 3) stores a tiered file received from a hot node (e.g., a node 120) of a plurality of nodes in cold storage as described in method 300 shown in FIG. 7. At 384, control synchronizes the tiered file to the filesystems on the plurality of nodes (e.g., nodes 120) prior to completion of opening the file on one of the plurality of nodes. The method 380 for synchronizing the tiered file to the filesystems on the plurality of nodes is described in detail with reference to FIG. 10 below.

Figure 10:
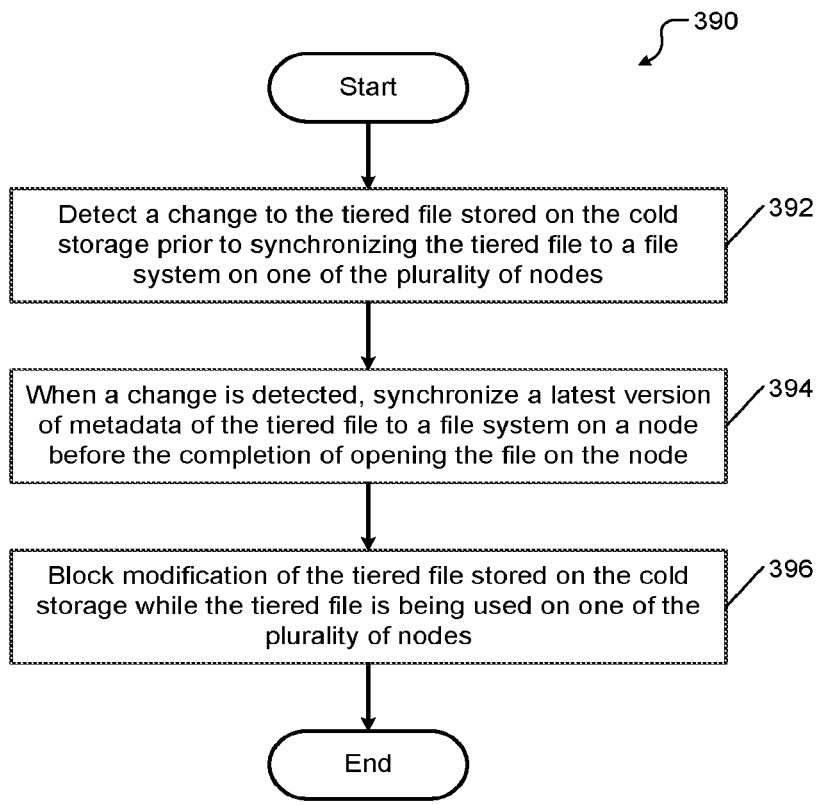
FIG. 10 shows a flowchart of the method of FIG. 9 in detail.

FIG. 10 shows a method 390 for synchronizing the tiered file to the filesystems on the plurality of nodes (e.g., nodes 120) according to the present disclosure. At 392, control (e.g., application 186 on the node 130 shown in FIG. 3) detects a change to the tiered file stored on the cold storage prior to synchronizing the tiered file to a file system on one of the plurality of nodes (e.g., a node 120). At 394, when a change is detected, control synchronizes a latest version of metadata of the tiered file to a file system on a node (e.g., a node 120) before the completion of opening the file on the node. At 396, control blocks modification of the tiered file stored on the cold storage while the tiered file is being used on one of the plurality of nodes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A computing system, comprising:
one or more processors; and
one or more storage devices comprising a cold storage medium and instructions executable by the one or more processors to:
receive a file to store on the cold storage medium;
store the file on the cold storage medium;
receive a request from a first hot storage node of a plurality of hot storage nodes to open the file for an operation comprising a read operation or a write operation;
create a read-only copy of the file on the cold storage medium;
prior to completing opening of the file for the operation, synchronize metadata of the file to the first hot storage node of the plurality of hot storage nodes, the metadata of the file comprising a pointer to a location in the cold storage medium at which the file is stored; and
after synchronizing the metadata of the file to the first hot storage node, complete opening of the file for the operation.

2. The computing system of claim 1, wherein the instructions executable to synchronize the metadata of the file to the first hot storage node of the plurality of hot storage nodes are executable to synchronize the metadata of the file to each hot storage node of the plurality of hot storage nodes.

3. The computing system of claim 1, further comprising instructions executable to, responsive to completing opening of the file, allow concurrent opens of the file across the plurality of hot storage nodes.

4. The computing system of claim 1, wherein the instructions executable to create the read-only copy of the file on the cold storage medium are executable to create the read-only copy of the file on the cold storage medium upon the first hot storage node opening the file.

5. The computing system of claim 1, wherein the instructions executable to create the read-only copy of the file on the cold storage medium are executable to create the read-only copy of the file upon the first hot storage node reading the file.

6. The computing system of claim 1, wherein the instructions executable to create the read-only copy of the file on the cold storage medium are executable to create the read-only copy of the file on the cold storage medium upon receiving the file to store on the cold storage medium.

7. The computing system of claim 1, further comprising instructions executable to, responsive to receiving the request to open the file, locate the file on the cold storage medium based at least on the location identified by the pointer of the metadata of the file.

8. The computing system of claim 1, further comprising instructions executable to block modification of the file on the cold storage medium while the file is open on the first hot storage node for the operation.

9. The computing system of claim 8, wherein the instructions executable to block modification of the file on the cold storage medium are executable to block modification of the file by the first hot storage node.

10. The computing system of claim 8, wherein the instructions executable to block modification of the file on the cold storage medium are executable to block modification of the file by the plurality of hot storage nodes.

11. The computing system of claim 1, wherein the metadata of the file comprises one or more of a size of the file and an attribute of the file.

12. The computing system of claim 1, further comprising instructions executable to, prior to completing opening of the file for the operation, detecting a change to the file on the cold storage medium via a single-file change detection mechanism.

13. A computing system, comprising:
one or more processors; and
one or more storage devices comprising a hot storage medium and instructions executable by the one or more processors to:
send a file stored at the hot storage medium to a cold storage node for cold storage, and retain first metadata of the file at the hot storage medium;
send a request to the cold storage node to open the file at the cold storage node for an operation comprising a read operation or a write operation;
receive second metadata of the file from the cold storage node;
synchronize the second metadata of the file received from the cold storage node with the first metadata of the file stored at the hot storage medium, the first metadata of the file stored at the hot storage medium comprising a pointer to a location in the cold storage node at which the file is stored; and
after synchronizing the second metadata with the first metadata, access the file at the cold storage node for the read operation or the write operation.

14. The computing system of claim 13, wherein the instructions executable to synchronize the second metadata with the first metadata comprise instructions executable to synchronize a size of the file or an attribute of the file.

15. The computing system of claim 13, wherein the first metadata of the file does not comprise data content of the file.

16. Enacted on a computing system, a method comprising:
receiving a file to store on a cold storage medium of the computing system;
storing the file on the cold storage medium;
receiving a request from a first hot storage node of a plurality of hot storage nodes to open the file for an operation comprising a read operation or a write operation;
create a read-only copy of the file on the cold storage medium;
prior to completing opening of the file for the operation, synchronizing metadata of the file to the first hot storage node of the plurality of hot storage nodes, the metadata of the file comprising a pointer to a location in the cold storage medium at which the file is stored; and
after synchronizing the metadata of the file to the first hot storage node, completing opening of the file for the operation.

17. The method of claim 16, wherein creating the read-only copy of the file comprises creating the read-only copy of the file upon receiving the file to store on the cold storage medium.

18. The method of claim 16, wherein creating the read-only copy of the file comprises creating the read-only copy of the file upon the first hot storage node reading the file.

19. The method of claim 16, wherein creating the read-only copy of the file comprises creating the read-only copy of the file upon the first hot storage node opening the file.

20. The method of claim 16, further comprising, responsive to completing opening of the file, allowing concurrent opens of the file across the plurality of hot storage nodes.

* * * * *